United States Patent
Rigal et al.

(10) Patent No.: US 8,116,255 B2
(45) Date of Patent: Feb. 14, 2012

(54) DEVICE FOR SEMI-TRANSPARENT MULTIPLEXING OF DATA STREAM FOR A COMMUNICATION SATELLITE

(75) Inventors: Christian Rigal, Portet sur Garonne (FR); Jean-Didier Gayrard, Cugnaux (FR)

(73) Assignee: Thales (FR)

( * ) Notice: Subject to any disclaimer, the term of this patent is extended or adjusted under 35 U.S.C. 154(b) by 866 days.

(21) Appl. No.: 12/066,497

(22) PCT Filed: Sep. 22, 2006

(86) PCT No.: PCT/FR2006/050927
§ 371 (c)(1),
(2), (4) Date: Jun. 17, 2008

(87) PCT Pub. No.: WO2007/034123
PCT Pub. Date: Mar. 29, 2007

(65) Prior Publication Data
US 2008/0252514 A1 Oct. 16, 2008

(30) Foreign Application Priority Data
Sep. 23, 2005 (FR) ...................................... 05 52835

(51) Int. Cl.
*H04B 7/00* (2006.01)

(52) U.S. Cl. ........................................ 370/321; 370/325

(58) Field of Classification Search .......................... None
See application file for complete search history.

(56) References Cited

U.S. PATENT DOCUMENTS

| | | | |
|---|---|---|---|
| 7,397,869 B2* | 7/2008 | Ginesi et al. | 375/326 |
| 7,817,759 B2* | 10/2010 | Jiang et al. | 375/354 |
| 2003/0133051 A1* | 7/2003 | Oishi et al. | 348/735 |
| 2005/0089068 A1* | 4/2005 | Sun et al. | 370/509 |
| 2005/0271083 A1* | 12/2005 | Spinoso | 370/466 |
| 2008/0222682 A1* | 9/2008 | Beales et al. | 725/70 |
| 2009/0303916 A1* | 12/2009 | Winkler et al. | 370/315 |

FOREIGN PATENT DOCUMENTS
EP  1 104 956  6/2001

* cited by examiner

*Primary Examiner* — Chi Pham
*Assistant Examiner* — Soon-Dong Hyun
(74) *Attorney, Agent, or Firm* — Lowe Hauptman Ham & Berner, LLP

(57) ABSTRACT

A device (D) is dedicated to data stream processing within a communication satellite of a communication network. This device (D) comprises processing means (MT) whose job is, in the event of receipt of a first incoming data stream whose carrier exhibits a first modulation and comprising at chosen locations chosen insertion blocks, i) to detect the insertion blocks and at least one characteristic of the carrier of the first incoming stream, chosen from among its frequency, its phase, its timing and its amplitude, ii) to modulate, in accordance with the first modulation and having regard to each detected characteristic, data packets to be transmitted to a destination common with that of the first incoming stream, and iii) to replace with the modulated packets certain at least of the insertion blocks detected in the first incoming stream which has not been demodulated, so that the resulting stream is transmitted by the satellite, with its first original modulation, to the common destination so as to be demodulated therein as if it had been constituted by a single modulator.

25 Claims, 3 Drawing Sheets

DEVICE FOR SEMI-TRANSPARENT MULTIPLEXING OF DATA STREAM FOR A COMMUNICATION SATELLITE

CROSS-REFERENCE TO RELATED APPLICATIONS

The present Application is based on International Application No. PCT/FR2006/050927, filed on Sep. 22, 2006, which in turn corresponds to French Application No. 05 52835, filed on Sep. 23, 2005, and priority is hereby claimed under 35 USC §119 based on these applications. Each of these applications are hereby incorporated by reference in their entirety into the present application.

FIELD OF THE INVENTION

The invention relates to communication networks comprising at least one communication satellite ensuring wave-based links between at least one satellite gateway and communication terminals, and more precisely the insertion at the level of such a satellite of traffic intended for communication terminals.

BACKGROUND OF THE INVENTION

The expression "communication terminal" is understood to mean any item of communication equipment, radio or wired, fixed or mobile (or portable) capable of connecting to a satellite network so as to exchange data in the form of signals with another item of equipment. It might therefore be, for example, a satellite communication terrestrial station, a satellite gateway, a fixed or mobile telephone, or an individual or collective reception terminal, or a fixed or portable computer or a personal digital assistant (or PDA) equipped with a satellite communication module.

As known by the person skilled in the art, certain satellite communication standards, such as for example DVB-RCS (for "Digital Video Broadcasting-Return Channel by Satellite"), have been designed for so-called star traffic that is to say traffic from communication terminals to satellite gateways, and vice versa. More precisely, the communications between a satellite gateway and communication terminals follow a so-called "outward" path, passing through a communication satellite, while the communications between communication terminals and a satellite gateway follow a so-called "return" path, passing through a communication satellite.

In the case, notably, of the DVB standard, the streams which follow the outward path are modulated according to the DVB-S2 standard (of TDM type), while the streams which follow the return path are modulated according to the DVB-RCS standard (of MF-TDMA type). Stated otherwise, a communication terminal sends in DVB-RCS and receives in DVB-S2, while a satellite gateway sends in DVB-S2 and receives in DVB-RCS.

In star traffic, traffic between two communication terminals coupled to one and the same satellite ("peer to peer" traffic) must pass through the satellite gateway, so doubling the transmission lag and mobilizing twice as many resources, which are valuable in the case of a satellite link.

To avoid doubling the transmission lag, a first solution consists for example in using a dedicated repeater satellite which serves only as transparent relay between the communication terminals. The traffic is then termed "mesh". The traffic streams not being processed in the repeater satellite (so-called transparent mode), compatibility of the communication terminals with the DVB standard is then no longer ensured. Specifically, the communication terminals send and receive in DVB-RCS, so they must be equipped with a multicarrier demodulator and be suitable for TDMA synchronization. However, an MF-TDMA demodulator is relatively expensive. Furthermore, this solution is not compatible with what is called the interconnection of satellite coverages.

A second solution consists in demodulating in the communication satellite the mesh traffic originating from the return path so as to insert it into an outward path dedicated to said mesh traffic. In this case, the communication terminals must be equipped with two outward path demodulators if they want to utilize the traffic of mesh and star types simultaneously.

A third solution consists in demodulating in the communication satellite, on the one hand, the traffic (mesh) originating from the return path and intended for the outward path, and on the other hand, the traffic (star) originating from the outward path and intended for the return path, so as to insert the mesh traffic into the outward path. The communication terminals thus comply with the DVB standard, and TDMA synchronization is ensured by the communication satellite. This operating mode of the communication satellite is termed regenerative, as opposed to the transparent mode of the first solution. The drawback of this solution resides in the fact that the entirety of the star traffic (following the outward path) must form the subject of a demodulation, then of a processing and finally of a remodulation in the communication satellite, including when there is no mesh traffic to be inserted into the outward path, even though the proportion of mesh traffic is generally low, typically less than 30%, and moreover variable. For example, in the case of an application relating to Internet access, only the interactive applications and the links between different "spots" (or coverage zones) actually require a mesh communication (or "single hop"). The onboard regenerative processing processor is therefore greatly overdimensioned with respect to the actual requirements, this being penalizing with regard to consumption and therefore limits the capacities of the satellite and thus penalizes the cost-effectiveness of the installation.

No known solution affording complete satisfaction, the aim of the invention is therefore to improve the situation.

SUMMARY OF THE INVENTION

It proposes for this purpose a data stream processing device, for a communication satellite of a communication network, comprising processing means charged with, in the event of receipt of a first incoming data stream whose carrier exhibits a first modulation and comprising chosen insertion blocks at chosen locations (corresponding to chosen instants):
  detecting the insertion blocks and at least one characteristic of the carrier of the first incoming stream, chosen from among the frequency, phase, timing and amplitude,
  modulating, in accordance with the first modulation and having regard to each detected characteristic, data packets to be transmitted to a destination common with that of the first incoming stream, and
  replacing with the modulated packets certain at least of the insertion blocks detected in the first incoming stream which has not been demodulated, so that the latter is transmitted by the satellite, with the first modulation, to the common destination.

Here the expression "incoming stream" is understood to mean an uplink stream entering a communication satellite and originating either from a communication gateway, or from a communication terminal, or else from another communication satellite.

The first incoming stream which is the subject of the insertion not being demodulated, and the inserted data packets being modulated according to each detected characteristic (and preferably all) of the carrier of the first stream, the downlink stream which results from the inserting of packets into said first incoming stream is then homogeneous and can be demodulated by a recipient terminal or station as if it had been constituted by a single modulator.

The stream processing device according to the invention can comprise other characteristics which can be taken separately or in combination, and notably:

- its processing means are preferably arranged so as to detect the characteristics—frequency, phase, timing and amplitude—of the carriers;
- its processing means can comprise i) analysis means charged with detecting each characteristic of the carriers of the first incoming streams received, ii) modulation means charged with modulating the packets to be transmitted, in accordance with the first modulation and having regard to each characteristic detected by the analysis means, and iii) insertion means charged with replacing certain at least of the detected insertion blocks with the packets which have been modulated by the modulation means, so that the first incoming stream into which they are inserted can be transmitted;
- its processing means can comprise detection means charged, in the presence of a first incoming stream comprising insertion blocks comprising a preamble defined by chosen symbols, with detecting a part at least of the symbols which define the preambles;
  - the detection means can then be charged with measuring the time interval between the preamble detections, and with comparing each measured interval with a threshold interval, so as to authorize the replacement of an insertion block with a packet to be transmitted that is modulated only when a measured interval is substantially equal to this threshold interval or to an integer multiple of the latter;
- in a first digital version, it can comprise i) first conversion means placed upstream of its analysis means and/or detection means and charged with converting into digital signals first incoming streams arising in analog form, ii) second conversion means placed downstream of its insertion means and charged with converting into analog signals the first incoming streams arising in a digital form, and iii) storage means coupled to the modulation means and to the insertion means and charged with storing the modulated packets to be transmitted which are pending transmission;
  - it can comprise timing means charged with defining a chosen operating tempo for the processing means and the first and second conversion means;
  - its detection means can be charged with duplicating the first incoming streams so as to detect the locations of the insertion blocks that they contain, and its analysis means can be charged with duplicating these first incoming streams so as to detect each characteristic (chosen from among the frequency, phase, timing and amplitude);
- in an analog version, its analysis means can be charged with tapping off a part of the first incoming streams so as to detect each characteristic (chosen from among the frequency, phase, timing and amplitude) and with delivering, on an output, signals representative of each detected characteristic. It then also comprises first switching means comprising an input suitable for receiving packets (pending transmission), a control input and an output that is suitable for supplying the modulation means with the packets (pending transmission) in the event of placement in a closed state. Additionally, its processing means comprise second switching means comprising an input coupled to the output of the analysis means for receiving signals representative of each detected characteristic, a control input and an output that is suitable for supplying the modulation means with the signals representative of each detected characteristic in the event of placement in a closed state. In this case, the insertion means are for example arranged in the form of a switch comprising a first input coupled to the output of the modulation means, a second input supplied with first incoming streams, a third control input and an output that is suitable for being coupled to the first or to the second input in the event of placement in a first or a second state so as to deliver the modulated packets to be transmitted or the first incoming streams to be transmitted. Additionally, the detection means are for example arranged to tap off a part of the first incoming streams so as to detect the locations of the insertion blocks that they contain and in delivering, on the one hand, to the first and second switching means control signals so as to place them in a closed state in the event of detection of an insertion block, and on the other hand, to the insertion means control signals so as to place them in the first or second state in the event of detection or absence of detection of an insertion block;
- its processing means can comprise delaying means, installed downstream of the detection means and/or analysis means and upstream of the insertion means, and charged with delaying a first incoming stream so as to allow the detection of the locations of the insertion blocks;
- in a second digital version, it can comprise:
  - at least two processing paths each able to receive first incoming streams originating from at least two different channels and each comprising i) first conversion means charged with converting into digital signals first incoming streams arising in an analog form, ii) analysis means charged with detecting each characteristic of the carriers of the first incoming streams delivered by the first conversion means and with delivering first signals representative of each detected characteristic, and iii) detection means charged, in the presence of a first incoming stream comprising insertion blocks comprising a preamble defined by chosen symbols, with detecting a part at least of the symbols defining the preambles inside time windows defined by signalling information and with delivering second signals representative of the temporal positions of certain at least of the insertion blocks,
  - control means charged i) with selecting the first incoming stream of one of the processing paths as a function of third signalling signals, ii) with defining signalling information representative of detection time windows on the basis of said third signalling signals and with communicating this signalling information to the detection means concerned, and iii) with delivering the first incoming stream selected accompanied by the second signals representative of the temporal positions of the insertion blocks to be replaced,
  - modulation means charged with modulating the packets to be transmitted, in accordance with the first modulation and having regard to the first signals delivered by the processing paths, and with replacing with the modulated packets, as a function of the second signals, certain at least of the insertion blocks detected and contained in the first incoming stream, so as to deliver a first incoming stream with inserted packets, and second conversion means charged with converting into analog signals the first incoming streams with inserted packets arising in a digital form, delivered by the modulation means;

the insertion blocks can for example exhibit a dimension (or duration) at least equal to that of a data packet contained in a stream;

the processing means can be charged, in the presence of a first incoming stream comprising groups of first and second consecutive insertion blocks, with replacing certain at least of the second insertion blocks with modulated packets to be transmitted;

the dimensions of the insertion blocks may possibly vary from one first incoming stream to another;

its processing means can be charged with processing first incoming streams which have undergone at least one change of frequency;

its processing means can be charged with processing first incoming streams transmitted by an item of communication equipment of the network such as for example a satellite communication gateway, a communication terminal, or a communication satellite;

its processing means preferably use the third signalling signals so as to insert packets to be transmitted into first incoming streams without introducing any delay.

The invention also proposes a data stream receiver, for a communication satellite, comprising at least one reception path able to receive first incoming streams in analog form, associated with a channel, and at least one stream processing device of the type of that presented above and coupled to at least one reception path.

Such a receiver can for example comprise at least two reception paths coupled to a single stream processing device. In this case, the reception paths are for example each coupled to the stream processing device by way of at least coupling means comprising an input, a first output, and a second output which is coupled to the device, and selection means are provided, comprising an input that can be supplied with first incoming streams delivered by the stream processing device, inputs coupled to the first respective outputs of the coupling means, and outputs equal in number to the number of reception paths, and charged with delivering on one of the outputs the first incoming streams entering one of the inputs, as a function of signalling signals.

Additionally, the receiver can also comprise demodulation means charged with demodulating second modulated incoming streams so as to deliver demodulated data packets suitable for being inserted into first incoming streams.

Moreover, the receiver can comprise switching means comprising at least two inputs, suitable for receiving first incoming streams originating from different satellite communication gateways, and at least one output suitable for supplying selectively with first incoming streams reception paths coupled to a stream processing device. Thus, one and the same device can be used to insert packets to be transmitted into first incoming streams whose carriers are different.

The invention also proposes a communication satellite, for a communication network, equipped with at least one stream processing device of the type of that presented above.

The invention also proposes a communication satellite, for a communication network, equipped with at least one receiver of the type of that presented above.

The invention also proposes a satellite communication gateway, for a communication network comprising at least one communication satellite of the type of that presented above, and charged with generating destined for the satellite first incoming streams whose carrier exhibits a first modulation and which comprise insertion blocks at chosen locations.

The invention is particularly well adapted, although in a nonexclusive manner, to satellite communication networks operating according to the DVB standard (DVB-RCS and DVB-S2) or any other packet-based transmission format. It applies to the satellite broadcasting of digital television programs, notably in high-definition, and to the transmission of multimedia contents.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

The appended drawings will be able not to only serve to complete the invention, but also to contribute to its definition, if appropriate.

The object of the invention is to allow the insertion into so-called downlink streams originating from a satellite gateway, at the level of a (tele)communication satellite, of traffic (or streams) intended for communication terminals.

Figure 1:
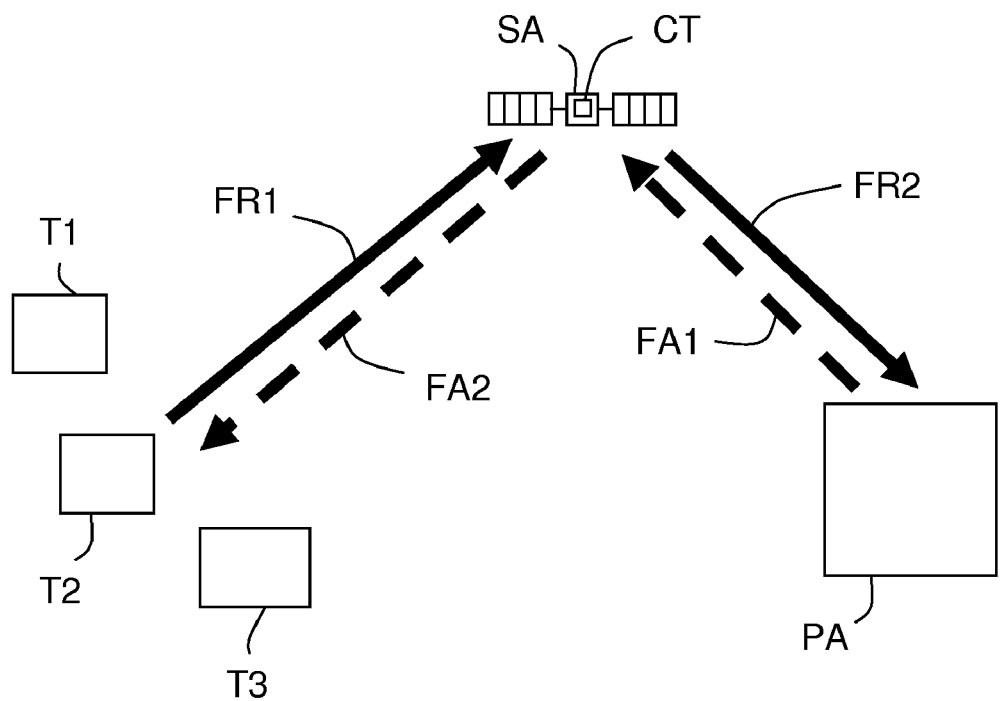
FIG. 1 illustrates in a very schematic manner the communication paths between a satellite gateway and communication terminals, via a communication satellite.

As is schematically illustrated in FIG. 1, a satellite communication network comprises at least one communication satellite SA allowing the exchange of data traffic or streams between communication equipment of the network, such as for example one or more satellite communication gateways PA (hereinafter called "gateways"), satellite communication terminals Ti (hereinafter called "terminals") and possibly one or more other communication satellites. The transmission of the streams from the satellite gateway PA to the terminals Ti is done on a so-called "outward" path FA1 and FA2, while the transmission of the streams from the terminals Ti to the satellite gateway PA is done on a so-called "return" path FR1 and FR2. Additionally, a stream entering a satellite SA and originating for example from a gateway PA or a terminal Ti is generally called an "uplink stream", and a stream exiting a satellite SA, and intended for example for a gateway PA or a terminal Ti, is generally called a "downlink stream".

In the example of FIG. 1, three terminals T1 to T3 (i=1 to 3) have been illustrated. But, the number of terminals Ti is not limited to this value. It can indeed take any nonzero value. Likewise, a single gateway PA has been represented, but the network can comprise several. Furthermore, a single satellite SA has been represented, but the network can comprise several.

Here the expression "terminal" is understood to mean any item of communication equipment, radio or wired, fixed or mobile (or portable) capable of connecting to a satellite network so as to exchange data in the form of signals with another item of equipment, and more precisely to receive downlink radio streams whose carrier exhibits a first modulation and of sending uplink radio streams whose carrier exhibits a second modulation. It might therefore be, for example, a satellite communication relay terrestrial station, a satellite gateway, a fixed or mobile telephone, or an individual or collective reception terminal, or a fixed or portable computer or a personal digital assistant (or PDA) equipped with a satellite communication module.

In what follows, it is considered by way of nonlimiting example that the streams are exchanged between the gateway PA and the terminals Ti according to the DVB standard (for "Digital Video Broadcasting") which is suitable for Internet access and for the transmission of multimedia contents. More precisely, the streams following the outward path FA1 and FA2 are modulated according to the DVB-S2 standard (of TDM type), while the streams following the return path FR1 and FR2 are modulated according to the DVB-RCS standard (of MF-TDMA type). Of course, the invention is not limited to this application. It also relates to the satellite broadcasting of digital television programs, notably in high-definition, and to the transmission of multimedia contents.

As indicated previously, the invention is intended to allow the insertion into first data streams entering the satellite SA, whose carriers exhibit (first) modulations and which originate, for example, from the outward path (that is to say the gateway PA), of data packets pending transmission in the satellite SA, and for example extracted from second incoming streams whose carriers exhibit second modulations and which originate, for example, from the return path FR1 (that is to say a terminal Ti).

It is important to note that the invention applies to data packets extracted in the satellite SA from second streams of any origin, and pending transmission.

Accordingly, the invention proposes to install a data stream processing device D in a stream processing card CT (or receiver) installed in the satellite SA and charged with receiving at least the first incoming streams and with amplifying them before retransmitting them to the terminals Ti. More precisely, the device D is charged with processing the first incoming streams entering at the level of the satellite SA, for example on the first part FA1 of the outward path (and originating from the gateway PA) before they are retransmitted, for example to recipient terminals Ti on the second part FA2 of this outward path.

Here, the term "processing" is understood to mean the fact of inserting data packets, extracted from a second incoming stream whose carrier exhibited a second modulation at the moment of reception, and pending transmission, into the downlink traffic, for example of the outward path. The data packets pending transmission are, for example, packets extracted from certain second uplink streams following, for example, the first part FR1 of the return path, and therefore having formed the subject of a demodulation by means of a demodulator DM of DVB-RCS type, installed for example on the processing card MT. This mode of extracting packets in satellites is notably used in certain operational satellites, such as for example Amazonas and Eutelsat W6.

Figure 2:
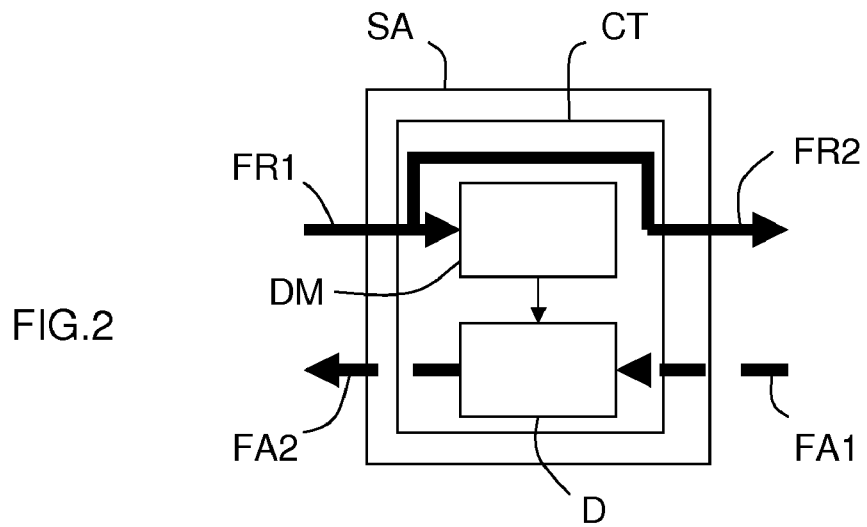
FIG. 2 illustrates in a very schematic manner the positioning of a stream processing device according to the invention with respect to the communication paths illustrated in FIG. 1.

It is important to note, as illustrated in FIG. 2, that the incoming streams, which do not contain any data packets having to be inserted into the outgoing streams, are not demodulated by the demodulator DM. They are amplified and possibly delayed in the satellite SA before being retransmitted to their destination (for example on the second part FR2 of the return path, to the gateway PA). For these streams the satellite SA therefore serves only as transparent relay.

A stream processing device D according to the invention comprises a processing module MT coupled to the demodulator DM and charged with inserting data packets extracted and pending transmission, notably those which have been demodulated by the demodulator DM, into first incoming streams arranged in a particular manner at the level of the gateway PA. Here, the expression "packet extracted (pending transmission)" is understood to mean a data packet extracted from a second incoming stream whose carrier exhibited on reception in the satellite SA a second modulation. An extracted packet is therefore demodulated, switched, possibly duplicated (in the case of "multicast" type broadcasting), at the ATM cell or MPEG packet level when its initial modulation was of DVB-RCS type.

Figure 3:
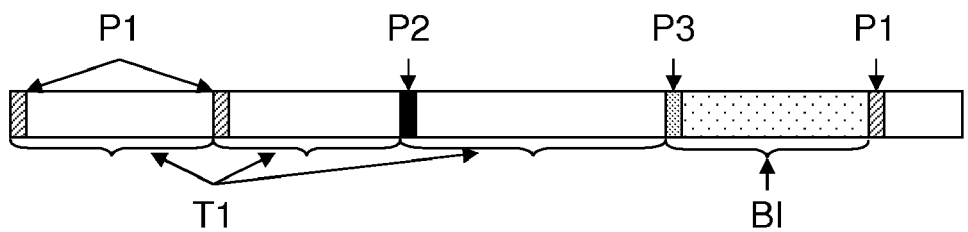
FIG. 3 illustrates in a very schematic manner an exemplary downlink stream comprising an insertion block intended to be replaced with data packets to be transmitted.

More precisely, the gateway PA generates (and transmits) first streams whose carrier exhibits the first modulation (here of DVB-S2 type) and which comprise chosen insertion blocks BI at chosen locations, intended to be, at least for certain of them, replaced in the satellite SA with data packets pending transmission. A schematic example of such a stream is illustrated in FIG. 3.

In this example, the first stream comprises data packets T1, comprising either a preamble (hatched) P1 or a preamble (black) P2, and an insertion block BI, such as for example a padding packet, comprising a preamble (grey) P3. These preambles P1, P2 and P3 consist of symbols that are known but of different types. Here, the hatched preambles P1 belong to packets which are not followed by an insertion block BI, and the black preambles P2 belong to packets which are followed by an insertion block BI.

It is important to note, on the one hand, that it is the gateway PA which defines within these first streams the respective proportions of the packets T1 and insertion blocks BI, as well as the size of the insertion blocks BI, having regard to the traffic to be inserted at the satellite SA level, and on the other hand, that the proportions and sizes may possibly vary from one first stream to another as a function of the evolution of the traffic to be inserted at the satellite SA level. For example, it is possible to envisage placing an insertion block BI every 5 or 10 packets T1. In certain embodiments, it is possible to use several devices D in parallel so as to insert more traffic at the satellite level while preserving a reasonable ratio between the packets and the insertion blocks.

The processing module MT of the device D is first of all charged with detecting, on the one hand, the insertion blocks BI which are contained in the first incoming streams received (here) on the outward path FA1, and on the other hand, at least one characteristic of the carrier of these same first incoming streams received, chosen from among its frequency, its phase, its timing (or symbol timing) and its amplitude (or power).

It is important to note that the detection may pertain to one at least of the aforesaid carrier characteristics, but that it is preferable that it pertains to all four. In what follows, it is considered by way of nonlimiting example that the four characteristics (frequency, phase, timing and amplitude) of the carrier are detected.

It is also charged with modulating, in accordance with the first modulation or waveform (here one of the possible modulation and coding states of DVB-S2 type) and having regard to the characteristics (of frequency, phase, timing and amplitude) that it has detected, extracted packets which are pending transmission in the satellite SA and which are intended, for example, for at least one terminal Ti.

It is finally charged with replacing with the extracted packets that it has modulated certain at least of the insertion blocks BI that it has detected in a first incoming stream, so that the latter is transmitted by the satellite SA, with the first modulation, to their common destination (for example terminals Ti). The packets pending transmission are thus multiplexed in the first incoming streams.

The processing undergone by the first incoming stream is of transparent type, since it forms the subject only of a replacement of insertion blocks (such as for example padding packets) BI with data packets, and not of a demodulation followed by a remodulation (as is the case in so-called regenerative processing). It is important to note that here it involves only a replacement with symbols which are consistent with the symbols of the remainder of the carrier, given that the replaced part of a first incoming stream reproduces the characteristics—frequency, phase, timing (symbol timing) and amplitude—of the carrier of this first incoming stream.

The device D according to the invention can be embodied in various ways.

Figure 4:
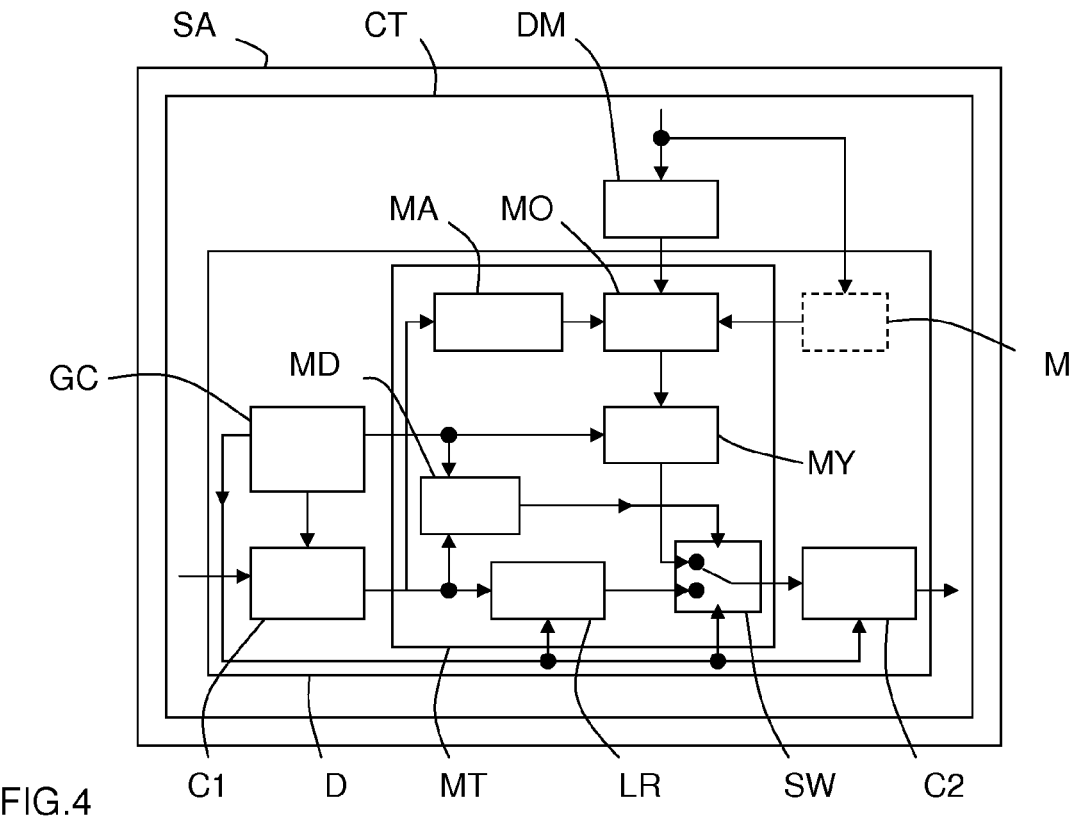
FIG. 4 illustrates in a very schematic manner a first exemplary embodiment of a stream processing device according to the invention.

FIG. 4 is now referred to in order to describe a first exemplary embodiment of a device D according to the invention. Here this is a digital embodiment.

In this embodiment, the device D comprises a processing module MT (ensuring the aforesaid functions), a first converter C1, a tempo generation module GC and a second converter C2, as well as possibly a control module MC of ACM type (for "Adaptive Coding Modulation").

The first converter C1 is charged with converting into digital data the first analog incoming streams to be processed (here arriving at the processing card CT level). These first analog incoming streams may have formed the subject of one or more frequency conversions. For example, when they are received with a frequency of 30 GHz, they may form the subject of a first frequency conversion so as to exhibit a frequency of about 20 GHz (RF), then of a bandpass filtering, then of a second frequency conversion (RF→IF) so as to exhibit a so-called intermediate frequency (or IF, corresponding to the L band, for example). This second frequency conversion may also be followed by a third frequency conversion (IF→BB) so as to exhibit a so-called baseband (or BB) frequency.

The second converter C2 is charged with converting into analog data the first digital incoming streams delivered by the output of the device D and having to be transmitted by the satellite SA to the recipient terminals Ti (after frequency conversion(s) and amplification).

The tempo generation module (or "tempo regulator") GC is charged with defining a chosen operating tempo for the processing module MT and the first C1 and second C2 converters. Stated otherwise, it is charged with providing clock signals making it possible to synchronize the elements of the device D with time constraint.

The possible control module MC (of ACM type) is charged with combatting the fadings undergone by the analog signals, which represent the streams, when they follow the outward path. Stated otherwise, they are charged with adapting the coding rate of the modulator MO of the device D as a function, notably, of the transmission conditions. This module ensures compliance with the DVB-S2 standard for the ACM sections of the standard. It acts as a function of the signalling information transmitted to it by the network control centre.

The digital processing module MT comprises, here, a digital analysis module MA, a digital detection module MD, a digital modulator MO, means of digital storage MY, means for delaying first digital streams LR, and a digital insertion module SW.

The analysis module MA is charged with detecting the characteristics—frequency, phase, timing (symbol timing) and amplitude—of the carrier of each first incoming stream digitized by the first converter C1. Accordingly, it can for example duplicate the digital data which are delivered by the first converter C1. The analysis module MA delivers, on its output, signals (or data) representative of the characteristics—frequency, phase, timing and amplitude—that it has detected.

The digital detection module MD is charged with detecting certain at least of the insertion blocks BI which are contained in the first incoming streams digitized by the first converter C1. To perform this detection, the detection module MD can for example duplicate the digital data which are delivered by the first converter C1.

When the first incoming streams are of the type of that illustrated in FIG. 3, the detection module MD is charged with detecting a part at least of the known symbols which constitute the preamble P2 of the packet which precedes an insertion block BI and a part at least of the known symbols which constitute the preamble P3 of an insertion block BI. Furnished with the tempo provided by the tempo regulator GC, it can thus date the starts of the preambles P2 and P3 with respect to the reference time of the device D and deduce therefrom the instant at which the insertion block BI which follows the preamble P2 and which comprises the preamble P3 will start. In the DVB-S2 waveform, the value of the preamble also participates in identifying the length of the block.

In order to limit the false alarms generated by the detection of payloads that are locally identical to a preamble of type P2 or P3, the detection module MD can also be charged with measuring the temporal distance separating the packets (or a multiple of this distance). It can then compare each measured distance with a threshold interval and authorize the insertion module SW to perform the replacement of an insertion block BI with a modulated packet, pending transmission in the memory MY, when the measured interval is substantially equal to the threshold interval or to an integer multiple of the latter.

The detection module MD delivers, on its output, signals (or data) representative of the estimated instants of the starts of the insertion blocks BI contained in the first digitized incoming streams, as well as possible signals (or data) representative of authorization or prohibition to replace.

The modulator MO is coupled to the output of the demodulator DM, which supplies it with data packets to be inserted (or multiplexed), as well as to the output of the analysis module MA, which provides it with the characteristics—frequency, phase, timing and amplitude—of the carrier of each first digitized incoming stream.

It is charged with modulating the data packets which are pending transmission. This modulation is performed in accordance with the first modulation (here DVB-S2), having regard to the characteristics—frequency, phase, timing and amplitude—detected by the detection module MD. It delivers, on its output, modulated data packets, ready to be inserted.

The storage means MY are charged with storing the modulated data packets which are delivered by the modulator MO so that they can be inserted when an insertion block BI is detected by the detection module MD. They are for example embodied in the form of a memory, possibly of FIFO type (for "First In First Out").

The means for delaying first streams LR comprise an input coupled to the output of the first converter C1, so as to be supplied with first digitized incoming streams, and an output coupled to the insertion module SW, so as to supply it with first digitized incoming streams delayed by a chosen duration. It forms part of the elements of the device D with time constraint. Consequently, it receives the tempo delivered by the tempo regulator GC. These means for delaying first streams LR take for example the form of a delay line. They are charged with delaying the first incoming streams having to form the subject of an insertion/replacement for a duration allowing the detection module MD to detect an insertion block BI, the analysis module MA to detect the characteristics of the carrier and the modulator MO to modulate the packets to be transmitted having regard to the characteristics detected by the analysis module MA.

The insertion module SW is charged with replacing certain at least of the insertion blocks BI, which have been detected by the detection module MD, with the modulated packets which are stored in the memory MY, pending insertion. Each time that it is authorized by the detection module MD to insert, at a determined instant, extracted packets stored in a first digitized incoming stream delivered by the delay line LR, it extracts from the memory MY the modulated data packet or packets to be transmitted, then removes from the first incoming stream the data constituting the detected insertion block BI so as to replace them with the modulated data packet or packets extracted. Then, it delivers on its output the first digital incoming stream having formed the subject of the insertion so that it is converted into a first analog incoming stream by the second converter C2.

Figure 5:
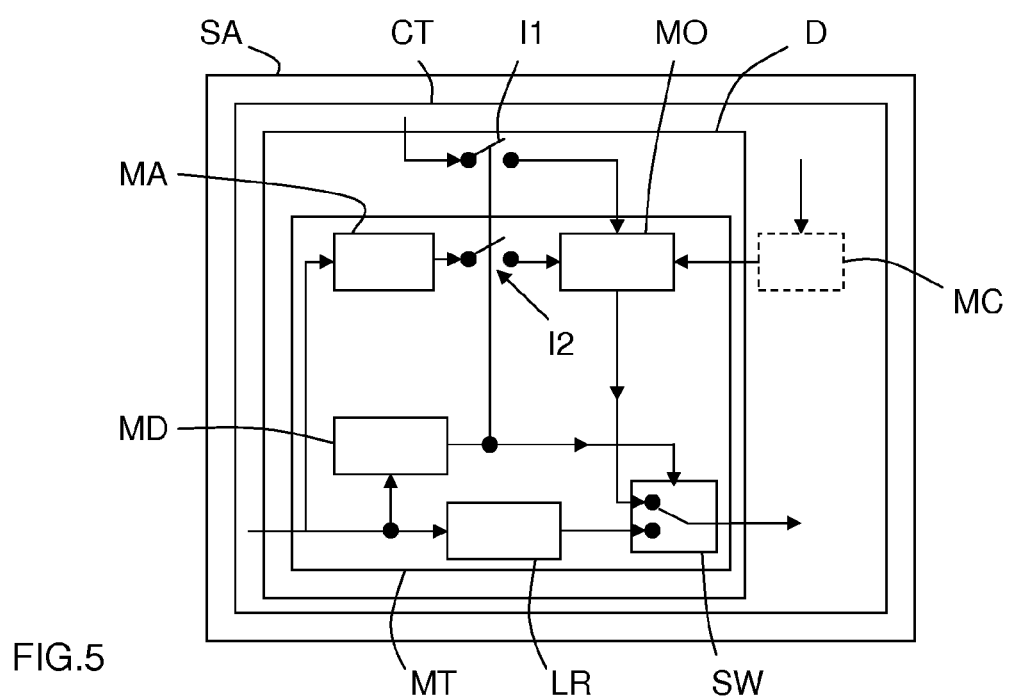
FIG. 5 illustrates in a very schematic manner a second exemplary embodiment of a stream processing device according to the invention.

FIG. 5 is now referred to in order to describe a second exemplary embodiment of a device D according to the invention. Here this is an analog embodiment.

In this embodiment, the device D comprises an analog processing module MT (ensuring the aforesaid functions) and first switching means I1, as well as possibly a control module MC of ACM type.

The first switching means I1 are for example embodied in the form of a breaker of 1×1 type comprising an input coupled to the demodulator DM so as to be supplied with packets pending transmission, an output and a control input for controlling the coupling of the input to the output as a function of instructions provided by the detection module MD of the processing module MT. When the breaker I1 is closed, the packets to be transmitted can pass from the demodulator DM to the modulator MO of the processing module MT. On the other hand, when the breaker I1 is open, the packets to be transmitted remain within the demodulator DM.

The analog processing module MT comprises, here, an analog analysis module MA, an analog detection module MD, second switching means I2, an analog modulator MO, means for delaying first analog streams LR, and an analog insertion module SW.

Except for the fact that they are of analog type, the analog analysis module MA, analog detection module MD, analog modulator MO, and means for delaying first analog streams LR ensure functions similar to those of the same digital elements, described above.

However, because of the analog nature of the signals constituting the first incoming streams and packets to be inserted, the operation of the device D differs from that of the previous device.

The analysis module MA is charged with detecting the characteristics—frequency, phase, timing (symbol timing), and amplitude—of the carrier of each first analog incoming stream. Accordingly, it can for example tap off a part of the analog signal representing the first incoming streams to be processed. The analysis module MA delivers, on its output, first analog signals representative of the characteristics—frequency, phase, timing and amplitude—that it has detected.

The second switching means I2 are for example embodied in the form of a breaker of 1×1 type comprising an input coupled to the analysis module MA so as to be supplied with first analog signals representative of the characteristics—frequency, phase, timing and amplitude—that it has detected, an output coupled to the modulator MO and a control input for controlling the coupling of the input to the output as a function of instructions provided by the detection module MD. When the breaker I2 is closed, the first analog signals can pass from the analysis module MA to the modulator MO. On the other hand, when the breaker I2 is open, the first signals remain within the analysis module MA.

The digital detection module MD is charged with detecting certain at least of the insertion blocks BI which are contained in the first analog incoming streams. To perform this detection, the detection module MD can for example tap off a part of the analog signal representing the first incoming streams to be processed.

When the first incoming streams are of the type of that illustrated in FIG. 3, the detection module MD is charged with detecting a part at least of the known symbols which constitute the preambles P2, which form part of the packets preceding the insertion blocks BI, and the preambles P3 which form part of the insertion blocks BI. In fact they are furnished with a known analog imprint. When a preamble P2 is detected at an instant tagged with respect to the reference time of the device D, the detection module MD deduces therefrom the instant at which the insertion block BI which follows this preamble P2 and which comprises the preamble P3 will start.

Again, a mechanism for limiting preamble detection errors can be implemented by the detection module MD.

The detection module MD delivers, on its output, second signals representative of the estimated instants of the starts of the insertion blocks BI contained in the first analog incoming streams, control signals serving as instructions for the first I1 and second I2 breakers, as well as possible signals (or data) representative of authorization or prohibition to replace an insertion block BI.

The modulator MO is coupled to the output of the first breaker I1, which cannot therefore supply it with data packets to be inserted (or multiplex) unless the detection module MD has placed it in a closed state corresponding to the detection of an insertion block BI, as well as to the output of the second breaker I2, which cannot therefore supply it with first signals (representative of the characteristics—frequency, phase, timing and amplitude—of the carrier of each first analog incoming stream) unless the detection module MD has placed it in a closed state corresponding to the detection of an insertion block BI.

It is charged with modulating the data packets which enter it, in accordance with the first modulation (here DVB-S2), having regard to the characteristics—frequency, phase, timing and amplitude—detected. It delivers, on its output, modulated data packets, ready to be inserted.

The means for delaying first streams LR comprise an input supplied with first analog incoming streams, and an output coupled to the insertion module SW so as to supply it with first analog incoming streams delayed by a chosen duration. These means for delaying first streams LR take for example the form of a delay line. They are charged with delaying the first incoming streams having to form the subject of an insertion/replacement for a duration allowing the detection module MD to detect an insertion block BI, the analysis module MA to detect the characteristics of the carrier and the modulator MO to modulate the packets to be transmitted having regard to the characteristics detected by the analysis module MA.

The insertion module SW is charged with replacing certain at least of the insertion blocks BI, which have been detected by the detection module MD, with the modulated packets which are delivered by the modulator MO.

Each time that the detection module MD authorizes an insertion at a determined instant, the first I1 and second I2 breakers are placed in their closed state thus allowing the modulator to modulate one or more packets to be inserted at the determined instant. When the packet or packets have been modulated, the insertion module SW collects it (them), then it removes from the first analog incoming stream (delivered by the delay line LR) the signal portion constituting the insertion block BI detected so as to replace it with the modulated packet or packets collected. Then, it delivers on its output the first analog incoming stream having formed the subject of the insertion.

Figure 6:
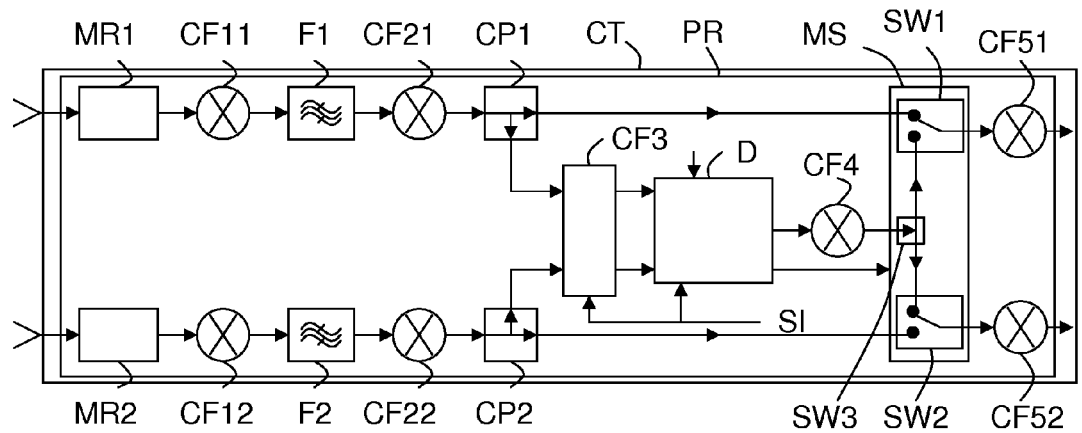
FIG. 6 illustrates in a very schematic manner an exemplary embodiment of a card (or receiver) for processing downlink streams originating from two different channels.
Figure 7:
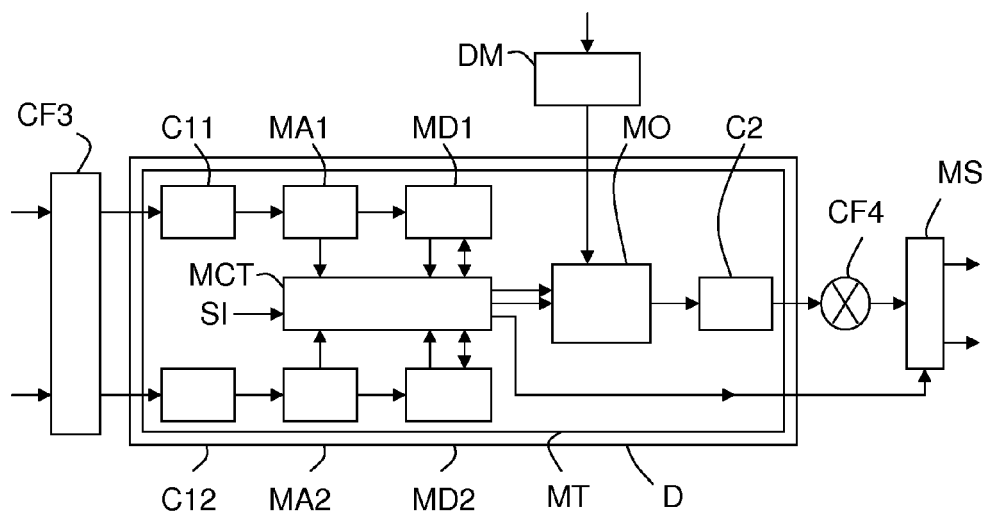
FIG. 7 illustrates in a very schematic manner a third exemplary embodiment of a stream processing device according to the invention able to form part of a processing card (or receiver) of the type of that illustrated in FIG. 6.

FIGS. 6 and 7 are now referred to in order to describe a third exemplary embodiment of a device D according to the invention. Here this is another digital embodiment.

This embodiment is suitable for the situations in which the satellite SA is furnished with at least two receive and send channels, as in the example illustrated in FIG. 6, and with at least one device D charged with processing the first incoming streams arising from these channels and having to form the subject of a possible insertion. In fact, when the satellite SA is furnished with several receive and send channels, it comprises a smaller number of devices D than the number of channels. In the example illustrated in FIG. 6 and described hereinafter, the satellite SA comprises two channels and a single device D.

In the example illustrated in FIG. 6, the processing card (or receiver) CT comprises a part RR dedicated to the reception of the first transmitted incoming streams, for example, on the outward path in two different channels.

This part RR comprises two reception paths each comprising, by way of illustrative and nonlimiting example:
- a signals reception module MRj (MR1 or MR2, here j=1 or 2),
- a first frequency conversion module CF1$j$ (CF11 or CF12), for example charged with converting the frequency of the signals received from 30 GHz to 20 GHz (RF),
- a bandpass filter Fj (F1 or F2), for example charged with filtering the signals having formed the subject of the first frequency conversion in a band of about 100 MHz,
- a second frequency conversion module CF2$j$ (CF21 or CF22), for example charged with converting the frequency of the filtered signals from 20 GHz (RF) to a so-called intermediate frequency (or IF, corresponding to the L band, for example), and
- coupling means CPj (CP1 or CP2), comprising an input coupled to the output of the second frequency conversion module CF2$j$, a first output coupled to a first input of a selection module MS, which will be returned lo later, and a second output. The first output makes it possible to route directly the first analog incoming streams, delivered by the reception path, downstream of the device D without them having formed the subject of an insertion. The second output makes it possible to route the first analog incoming streams, delivered by the reception path, to the device D so that they form the subject of an insertion. They are for example embodied in the form of coaxial radiofrequency (RF) couplers.

Of course, the number of frequency conversion modules can be different from that presented above.

As illustrated in FIG. 6, it may be possible to insert a third frequency conversion module CF3 between the second outputs of the coupling means CPj and the device D. This makes it possible to perform a third frequency conversion of type IF→BB on the analog signals delivered by the reception paths, so that they exhibit a baseband frequency (or BB frequency, corresponding for example to 200 MHz).

The device D can thus be supplied with baseband signals representative of the first incoming streams received on each of the channels (here two in number by way of nonlimiting example).

This device D, which will be described later, comprises an output delivering first digital incoming streams having formed the subject of insertions/replacements which may form the subject of a frequency conversion, for example of BB→IF type by means of a fourth conversion module CF4. The latter supplies the second input of a selection module MS comprising as many routing means of 2×1 type as there are reception paths. In the example illustrated, the selection module MS comprises two lateral routing means SWj (SW1 and SW2) and a central routing means SW3. The central router SW3 comprises an input coupled to the output of the fourth frequency converter CF4 and as many outputs as there are reception paths (here two). Each lateral routing means SWj comprises a first input coupled to the first output of a coupling means CPj, a second input coupled to one of the outputs of the central router SW3, and an output supplying for example a fifth frequency converter CF5$j$. The latter is for example charged with converting the frequency of first incoming streams, to be retransmitted (after insertion or without insertion) on one of the channels, from the intermediate frequency IF to the frequency of 20 GHz (RF) before they arrive at the level of a power amplifier charged with adjusting the gain of the chain.

In this third digital embodiment, the processing module MT comprises first of all as many processing paths as there are reception paths associated with different channels processed by its device D (before switching). Consequently, in this example there are two processing paths each comprising:
- a first converter C1$j$ (C11 or C12), charged with converting into digital signals the first analog incoming streams which originate, here, from the third frequency converter CF4 (originating from one of the reception paths),
- a digital analysis module MAj, of the type of that described previously with reference to FIG. 1. This digital analysis module MAj is, like the previous one, charged with detecting the characteristics—frequency, phase, timing and amplitude—of the carriers of the first incoming streams delivered by the first converter C1$j$, and with delivering first signals representative of the characteristics detected. The number of packets, of a first incoming stream, necessary for detecting the characteristics of the carrier of this first incoming stream, depends on the waveform and, to a lesser extent, the signal-to-noise ratio. Typically, between 10 and 100 packets are necessary to detect the characteristics of a carrier, and a digital detection module MD$j$, of the type of that described previously with reference to FIG. 1. This digital detection module MD$j$ is, like the previous one, charged, in the presence of first incoming streams comprising insertion blocks BI preceded by preambles P2 and P3 defined by chosen symbols, with detecting a part at least of the symbols which define these preambles P2 and P3, and with delivering second signals representative of the temporal positions of certain at least of these detected insertion blocks BI.

In this third embodiment the analysis and the detection are done for example by duplicating the streams delivered by the first converter C1$j$.

The processing module MT also comprises a control module MCT, a modulator MO and a second converter C2.

The control module MCT is coupled to the outputs of the analysis modules MA$j$ and detection modules MD$j$, so as to be supplied with first and second signals, that is to say with characteristics—frequency, phase, timing and amplitude—of the carriers of the first incoming streams originating from each of the processing paths and with temporal information relating to the starting instants of the insertion blocks BI. It also comprises a control input receiving third signalling signals SI transmitted by the gateway PA on a signalling channel and containing information relating to the construction of the first incoming streams, and notably to the temporal positions of the preambles P1 to P3 that they contain, as well as to the first incoming streams having to form the subject of insertions/replacements.

By virtue of these third signalling signals SI, the control module MCT can first of all select each first incoming stream having to form the subject of an insertion.

By virtue of the third signalling signals SI, the control module MCT can also address to the detection modules MD$j$ signalling information defining time windows inside which are supposedly located the known symbols of the preambles P2 and/or P3 to be detected within the first digitized incoming streams which respectively relate to them. It is then during these time windows that the detection modules MD$j$ perform their detections (or acquisitions) so as to determine the temporal position, with respect to the internal clock of the device D, of each insertion block BI having to be replaced.

Still by virtue of the third signalling signals SI, the processing module MT can insert packets to be transmitted into first incoming streams without introducing any delay. Specifically, the insertion device predicts the position of the insertion blocks with the aid of the signalling received, which provides the insertion interval and the position of the preambles and consequently the precise position of the insertion blocks BI to within the symbol fraction. It is therefore capable of replacing in the carrier which transports the incoming stream the insertion blocks BI with data packets without introducing any delay and without disturbing the characteristics—frequency, phase, timing and amplitude—of this carrier.

Finally, the control module MCT can deliver on a first output each first incoming stream that it has selected, with the second signals representative of the temporal positions of the insertion blocks BI to be replaced (provided by the detection modules MD$j$).

As illustrated, the control module MCT also delivers on a second output the first signals representative of the characteristics—frequency, phase, timing and amplitude—of the carrier of the first incoming stream that it has selected.

It finally comprises a third output coupled to the selection module MS and charged with controlling the respective states of its lateral SW$j$ and central SW3 routing means having regard to the signalling information SI received.

The first and second outputs of the control module MCT are coupled to a digital modulator MO. The latter is charged with modulating the data packets pending transmission, which are communicated to it by the demodulator DM of the processing card MT. This modulation is performed in accordance with the first modulation (here of DVB-S2 type), having regard to the first signals delivered by the detection modules MD$j$ of the processing paths, and during the instants (temporal positions) defined by the second signals.

Once the digital modulator MO has modulated data packets, it undertakes the replacement of the data, which constitute the insertion block BI designated temporally by the second signals delivered by the control module MCT, with these modulated packets. Then, it delivers the first digital incoming stream having formed the subject of the insertion/replacement on an output.

The second converter C2 of the processing module MT is then charged with converting into analog signals the first incoming stream delivered by the output of the modulator MO. As indicated previously, the output of the second converter C2 supplies with first digitized incoming stream, having inserted modulated packets, a fourth frequency converter CF4 (BB→IF), for example, which itself supplies the selection module MS charged with routing the streams to the chain's power amplifiers associated with the various transmission channels, as a function of the instructions provided by the control module MCT.

It is important to note that the processing card CT or (receiver) can comprise a switching module (not represented), placed upstream of its reception paths (MR$j$, CF1$j$, F$j$, CF2$j$) and comprising, on the one hand, at least two inputs able to receive first incoming streams originating from various satellite communication gateways SA (and therefore exhibiting different carriers), and on the other hand, at least one output that can be coupled to at least one reception path so as to supply it selectively with first incoming streams of different origins. In this way, it is possible to use one and the same device D to insert packets to be transmitted into first incoming streams whose carriers are different.

The stream processing device D according to the invention, and notably its processing module MT, can be embodied in the form of electronic circuits, software (or computer-based) modules, or of a combination of circuits and software.

The invention is not limited to the embodiments of stream processing device, stream receiver, processing card, communication satellite and satellite communication gateway described above, merely by way of example, but it encompasses all the variants that may be envisaged by the person skilled in the art within the scope of the claims hereinafter.

Thus, in the foregoing, examples were described in which the first incoming streams originated from a satellite communication gateway and the second incoming streams originated from communication terminals. But, the first incoming streams could originate from another communication satellite or from terminals, and the second incoming streams could originate from another communication satellite or from a satellite communication gateway.

The invention claimed is:

1. A data stream processing device for a communication satellite of a communication network, comprising:
processing means arranged, in an event of receipt of a carrier modulated with a first incoming data stream using a first modulation and the first incoming data stream comprising at chosen locations insertion blocks, i) to detect said insertion blocks and at least one characteristic of the carrier of said first incoming data stream, chosen from among an amplitude, a frequency, a phase and a timing, ii) to modulate, in accordance with said first modulation and based on each detected characteristic, data packets to be transmitted to a common destination with a destination of the first incoming data stream, and iii) to replace one or more of said insertion blocks detected in said carrier modulated with the first incoming data stream with said modulated packets so that the carrier modulated with the first incoming data stream and said modulated packets are transmitted with said first modulation by said satellite to said common destination.

2. The device as claimed in claim 1, wherein said processing means are arranged to detect the characteristics regarding amplitude, frequency, phase and timing of the carrier of the first incoming data stream received.

3. The device as claimed in claim 1, wherein said processing means comprise analysis means arranged to detect each characteristic of the carrier of the first incoming data stream received, modulation means arranged to modulate said packets to be transmitted, in accordance with said first modulation and having regard to each characteristic detected by said analysis means, and insertion means arranged to replace certain at least of said detected insertion blocks with said packets modulated by said modulation means, with a view to the transmission of said first incoming data stream.

4. The device as claimed in claim 3, comprising i) first conversion means placed upstream of said analysis means and/or of said detection means and arranged to convert into digital signals the first incoming data stream arising in an analog form, ii) second conversion means placed downstream of said insertion means and arranged to convert into analog signals the first incoming data stream arising in a digital form, and iii) storage means coupled to said modulation means and to said insertion means and arranged to store said modulated packets to be transmitted.

5. The device as claimed in claim 4, comprising timing means arranged to define a chosen operating tempo for said processing means and said first and second conversion means.

6. The device as claimed in claim 4, wherein said detection means are arranged to duplicate said first incoming data stream so as to detect the locations of said insertion blocks that they contain, and in that said analysis means are arranged to duplicate said first incoming data stream so as to detect each characteristic of the carrier.

7. The device as claimed in claim 3, wherein said analysis means are arranged to tap off a part of said first incoming data stream so as to detect each characteristic of the carrier, and to deliver, on an output, signals representative of each detected characteristic of the carrier, in that said analysis means comprises first switching means comprising an input suitable for receiving packets to be transmitted, a control input and an output that is suitable for supplying said modulation means with said packets to be transmitted in the event of placement in a closed state, in that said processing means comprise second switching means comprising an input coupled to the output of said analysis means for receiving signals representative of each detected characteristic of the carrier, a control input and an output that is suitable for supplying said modulation means with said signals representative of each detected characteristic of the carrier in the event of placement in a closed state, in that said insertion means are arranged in the form of a switch comprising a first input coupled to the output of said modulation means, a second input receiving said first incoming data stream, a third control input and an output that is suitable for being coupled to the first or to the second input in the event of placement in a first or a second state so as to deliver said modulated packets to be transmitted or said first incoming data stream to be transmitted, and in that said detection means) are arranged to tap off a part of the first incoming data stream so as to detect the locations of the insertion blocks that they contain and deliver to said first and second switching means control signals so as to place said first and second switching means in a closed state in the event of detection of an insertion block, and deliver to said insertion means control signals so as to place switching means and said insertion means in said first or second state in the event of detection or absence of detection of an insertion block.

8. The device as claimed in claim 3, wherein said processing means comprise delaying means, installed downstream of said detection means and/or of said analysis means and upstream of said insertion means, and arranged to delay a the first incoming stream so as to allow the detection of the locations of insertion blocks of the first incoming stream.

9. The device as claimed in claim 1, wherein said processing means comprise detection means arranged, in a presence of said first incoming data stream comprising said insertion blocks including preambles defined by chosen symbols, to detect a part at least of said symbols defining said preambles.

10. The device as claimed in claim 9, wherein said detection means are arranged to measure a time interval between detections of successive preambles, and to compare each measured interval with a threshold interval, so as to authorize the replacement of an insertion block with a modulated packet to be transmitted only when a measured interval is substantially equal to said threshold interval or to an integer multiple of the said threshold interval.

11. The device as claimed in claim 1, comprising:
at least two processing paths suitable for each receiving a plurality of first incoming streams originating from at least two different channels and each comprising i) first conversion means arranged to convert into digital signals first incoming streams arising in an analog form, ii) analysis means arranged to detect each corresponding characteristic of a corresponding carrier of each of the first incoming streams delivered by said first conversion means and to deliver corresponding first signals representative of each detected corresponding characteristic, and iii) detection means arranged, in a presence of a one of the first incoming streams comprising insertion blocks including preambles defined by chosen symbols, to detect a part at least of said symbols defining said preambles inside time windows defined by signalling information and deliver second signals representative of temporal positions of said insertion blocks,
control means arranged i) to select a one of the first incoming streams of one of said processing paths as a function of third signalling signals, ii) to define signalling information representative of detection time windows on the basis of said third signalling signals and to communicate this signalling information to the detection means concerned, and iii) to deliver the one of the first incoming streams selected accompanied by the second signals representative of said temporal positions of the insertion blocks to be replaced, modulation means arranged to modulate said packets to be transmitted, in accordance with said first modulation based on to said corresponding first signals delivered by said processing paths, and to replace at least of said insertion blocks detected with said modulated packets, at instants defined by said second signals, so as to deliver a first incoming stream with inserted packets, and second conversion means arranged to convert into analog signals the first incoming stream with inserted packets arising in a digital form, delivered by said modulation means.

12. The device as claimed in claim 11, wherein said processing means are arranged to use said third signalling signals so as to insert packets to be transmitted into the first incoming data stream without introducing any delay.

13. The device as claimed in claim 1, wherein said insertion blocks have a dimension at least equal to a dimension of a packet contained in the first incoming data stream.

14. The device as claimed in claim 13, wherein said processing means are arranged, in a presence of said first incoming data stream comprising groups of said first and second consecutive insertion blocks, to replace one or more of the second insertion blocks with modulated packets to be transmitted.

15. The device as claimed in claim 1, wherein dimensions of said insertion blocks of the first incoming data stream differ from insertion blocks of another first incoming data stream.

16. The device as claimed in claim 1, wherein said processing means are arranged to process the first incoming data stream after the first incoming stream has undergone at least one change of carrier frequency.

17. The device as claimed in claim 1, wherein said processing means are arranged to process the first incoming data stream transmitted by at least one of a satellite communication gateway, a communication terminal, and a communication satellite.

18. A data stream receiver for a communication satellite of a communication network, wherein the data stream receiver comprises at least one reception path suitable for receiving the first incoming data stream in analog form, associated with a channel, and at least one stream processing device as claimed in claim 1, coupled to at least one reception path.

19. The receiver as claimed in claim 18, wherein the receiver comprises several reception paths coupled to a smaller number of stream processing devices than the number of reception paths.

20. The receiver as claimed in claim 19, wherein said reception paths are each coupled to said stream processing device by way of at least coupling means comprising an input, a first output, and a second output which is coupled to said device, and in that the coupling means comprises selection means, comprising an input suitable for being supplied with the first incoming data steam delivered by said stream processing device and inputs coupled to the first respective outputs of said coupling means, and outputs equal in number to the number of reception paths, and arranged to deliver on one of said outputs the first incoming data stream entering on one of said inputs as a function of signalling signals.

21. The receiver as claimed in claim 19, comprising switching means comprising at least two inputs, suitable for receiving first incoming streams originating from different satellite communication gateways, and at least one output suitable for supplying selectively with first incoming streams reception paths coupled to a stream processing device.

22. The receiver as claimed in claim 18, comprising demodulation means arranged to demodulate second modulated incoming streams so as to deliver demodulated data packets suitable for being inserted into first incoming streams.

23. A communication satellite for a communication network, comprising at least one receiver as claimed in claim 18.

24. A communication satellite for a communication network, comprising at least one data stream processing device as claimed in claim 1.

25. A satellite communication gateway (PA), for a communication network comprising at least one communication satellite (SA) as claimed in claim 24, wherein the satellite communication gateway is arranged to generate destined for said satellite the first incoming data stream the carrier of the first incoming data stream exhibiting a first modulation and comprising at one or more locations insertion blocks.

\* \* \* \* \*